CIRCUIT-ARRANGEMENT FOR SCANNING EQUIDISTANT LINES ON A SCREEN OF A CATHODE-RAY TUBE AND CATHODE-RAY TUBE FOR USE IN SUCH A CIRCUIT

Filed Dec. 26, 1951

INVENTOR

Adrianus Johannes Wilhelmus Marie Van Overbeek

By Fred M Vogel

AGENT

United States Patent Office 2,728,026

Patented Dec. 20, 1955

2,728,026

CIRCUIT-ARRANGEMENT FOR SCANNING EQUIDISTANT LINES ON A SCREEN OF A CATHODE-RAY TUBE AND CATHODE-RAY TUBE FOR USE IN SUCH A CIRCUIT

Adrianus Johannes Wilhelmus Marie van Overbeek, Eindhoven, Netherlands, assignor to Hartford National Bank and Trust Company, Hartford, Conn., as trustee Application December 26, 1951, Serial No. 263,342

Claims priority, application Netherlands January 4, 1951

1 Claim. (Cl. 315—21)

The invention relates to a circuit-arrangement for scanning lines which are equidistantly spaced on a screen of a cathode-ray tube and also relates to a cathode-ray tube for use in such a circuit-arrangement. This invention is of particular importance for color television purposes.

The lines are scanned in known manner by means of an electron beam, which is deflected by line and image deflection means.

In certain color television methods it has been found that the lines to be scanned need be equally spaced apart and, moreover, be traced at definite locations of the screen.

This applies, for example, to those color television transmission systems in which, on the receiver side, the cathode-ray beam of the reproducing tube is modulated by successive signals of different color content and in which these successive signals must be reproduced at corresponding luminescent lines of the screen.

This screen may, for example, have successive lines of red, green, blue, red luminescence and so on.

The incoming signals of red color content of the image must each time be reproduced at the lines of red luminescence of the screen, and so forth.

Consequently, the scanning beam must exactly strike a red line and not the preceding blue line or the next green line.

If this condition is fulfilled, for example, for the first three lines of the screen, an exact coincidence of the colors will not take place at all times, as the image deflection is, as a rule, not quite linear with time. Consequently, the pattern of fluorescent lines provided on the screen is shifted relative to the pattern traced by the beam.

The object of this invention is to provide an improved pattern coincidence.

In the circuit-arrangement according to the invention, a cathode-ray tube with a special comb-shaped electrode is used. The teeth of this electrode are equidistantly spaced and extend on the scanned side of the screen in a direction substantially parallel to the direction of the lines. The tooth length is equal to the length of part of the path covered by the beam under the control of the line deflections means. The comb-shaped electrode is connected to a control-grid of a discharge tube, which is periodically rendered conductive for at least part of the time during which the beam covers the said portion of the path adjacent a parallel side of the teeth. A control-voltage is derived from the output circuit of this discharge tube and applied to the image deflection means to adjust the image deflection of the beam.

In order that the invention may be more clearly understood and readily carried into effect, it will now be described more fully with reference to the accompanying drawing.

Figure 1:
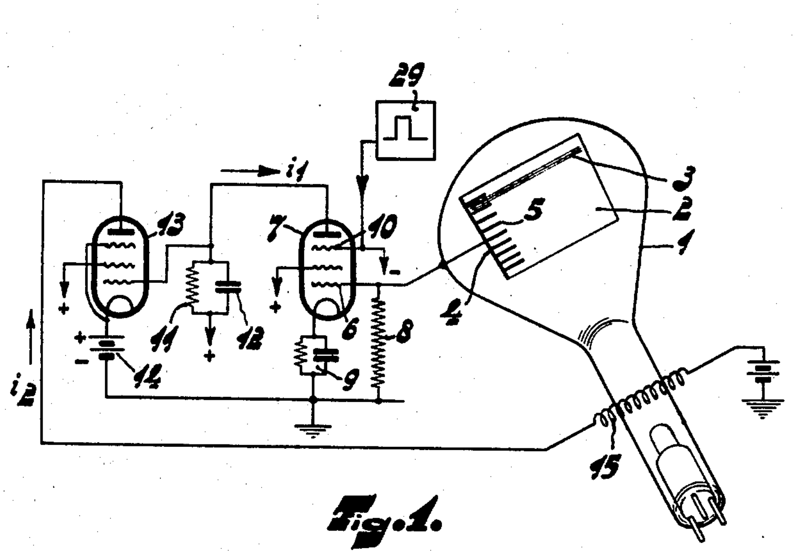
Fig. 1 shows diagrammatically one embodiment of the circuit-arrangement according to the invention.

The circuit-arrangement shown in Fig. 1 comprises a cathode-ray tube 1, provided with known means (not shown) to produce a cathode-ray beam.

This beam is used to scan a screen 2, which is provided with fluorescent material, along horizontal, equidistant lines 3.

For this purpose the beam is deflected both in line and image directions in known manner with the use of line and image deflection means (not shown).

At the side of the screen 3 a comb-shaped electrode 4 of conductive material is arranged on the side of the scanning beam and may be integral with the screen.

Figure 2:
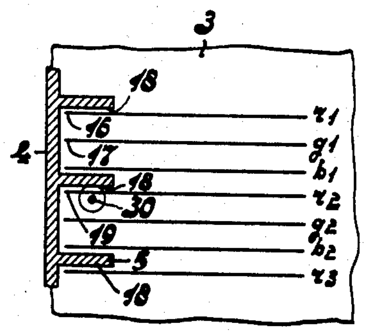
Fig. 2 is a detail view of the screen and the comb-shaped electrode of the cathode-ray tube shown in Fig. 1.
Figure 3:
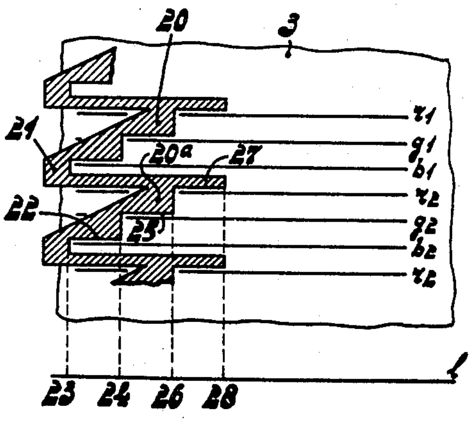
Fig. 3 shows a further embodiment of the comb-shaped electrode and the screen.

The teeth 5 of this electrode extend along part of the lines 3, as is shown in Figs. 2 and 3.

The electrode 5 is connected to the control-grid 6 of the discharge tube 7 and the control-grid circuit includes a resistor 8.

The cathode circuit comprises the parallel combination 9 of a cathode resistor and a bypass capacitor which serves to bias the tube.

The collecting grid 10 of the tube 7 is so supplied with a voltage of such value that the tube is normally cut off.

To this collecting grid are periodically supplied voltage pulses of positive polarity. These pulses are supplied, for example, from a pulse generator 29. When these pulses are supplied, the tube becomes conductive and an anode current begins to flow, which varies with the voltage variations across the resistor 8.

The anode circuit includes an integrating network constituted by the parallel combination of a resistor 11 and a capacitor 12.

A control-voltage is developed across this network and is supplied to a discharge tube included in a direct current amplifier.

The cathode-lead includes a battery 14, which serves to compensate the high direct voltage, which is operative at the control-grid of the tube 13.

The anode circuit of the tube 13 includes a deflection coil 15 for image deflection of the beam of the cathode-ray tube 1.

The screen 3 and the comb-shaped electrode 4 having teeth 5 may be constructed as is shown in Fig. 2.

The screen 3 is provided with a number of equidistant lines or strips of fluorescent material $r_1$, $g_1$, $b_1$, $r_2$ and so on.

The line $r_1$ becomes red luminescent when struck by the cathode-ray beam, line $g_1$ green, line $b_1$ blue, line $r_2$ red, and so on.

Under the control of the deflection means, the beam will move, if correctly adjusted, from point 16 along the line $r_1$ to the right, then, after having scanned this line, it will rapidly move to the left, it being shifted in place under the control of the image deflection means to such an extent that it starts scanning again at 17, in this case, of line $g_1$.

The comb-shaped electrode is inserted in front of or on the screen 3. A tooth 5 of the electrode is provided for every three lines.

The corresponding sides of these teeth, for example, all the lower sides 18, are substantially parallel to the direction of the lines and extend along a portion of the total path which the beam is adapted to cover under the control of the line deflection means.

If the image deflection of the beam does not occur in a sufficiently linear manner, the line $r_1$, for example, may be scanned correctly and the scanning of the line $g_1$ may still be tolerable, but the line $b_1$ will be poorly scanned, since the beam has not been deflected correctly.

After the beam has scanned the line $b_1$ to the right, it flies back to the left to scan the line $r_2$ subsequently.

Then, owing to the non-linear deflection, the center of the beam will, however, not occupy the spot 19; but it will fall higher or lower than the spot.

If the center of the beam falls below the spot, as is indicated at 30, only a small part of the beam strikes the adjacent tooth of the electrode 4, whereas in the correct position, a larger part of the beam will strike the electrode 4.

In the circuit-arrangement shown in Fig. 1, the current passing through the resistor 8 thus decreases, as compared with the current which will pass at the normal, desired beam position, and the potential of the control-grid 6 becomes more positive.

The instants when pulses supplied to the collecting grid 10 of the tube 7 are produced and the duration of these pulses are chosen to be such that the tube 7 conducts current during the time in which the beam moves from point 19 along the tooth up to the end of the tooth.

The tube is rendered conductive by these pulses. As the grid voltage has been increased because of the decrease in current flow through resistor 8, the anode current $i_1$ produced exceeds its normal value. The voltage at the integrating network 11, 12 drops and the anode current $i_2$ across anode circuit of the tube 13 and the image deflection coil 15 decreases.

The polarity of this coil 15 is such that, for decreasing current strength, the beam is deflected vertically downwards.

If the comb-shaped electrode 4 is secondarily emissive, the coil must be turned by 180° in order to obtain the same deflection.

This downward deflection is thus decreased, so that the beam moves upwards and the center 20 will practically coincide with the axis of the fluorescent line $r_2$.

If, conversely, the center 30 of the beam is too high, the current passing through the deflection coil 15 will increase and the deflection will thus be again corrected in the desired sense.

The correction circuit operates as long as the beam moves along the tooth, since during at least a portion of this period the tube can conduct current depending on the pulse duration of the collecting grid pulses.

Therefore, when the beam leaves the tooth, it has reached substantially the correct position.

In order to maintain this position as far as possible, until the new correction takes place, when the next following tooth is reached, the time constant of the network 11, 12 must be sufficiently high.

If it is desired, the correction current may be reduced to zero, after an image has been completely scanned, for example, by transiently short-circuiting the network 11, 12.

As has been stated above, only one tooth is provided for each group of three lines (Fig. 2). It is, of course, also possible to provide a tooth for each line, or for every two or four lines.

In general, the sides 18 of the teeth will be made parallel to the direction of the lines, which, however, is not strictly necessary if only care is taken that, at the time when the beam leaves the tooth, or at the time when the beam reaches the point corresponding to the reblocking of the tube 7, the beam has substantially reached correct position.

The release pulses need not be derived from a separate generator 11; they may be derived from the synchronizing pulses which initiate the flyback of the line scanning.

For this purpose these pulses may, if necessary, be delayed and their recurrence frequency may, in the present example, be divided by three.

It is important to point out that it is not necessary to cut the tube off with pulses from an external source.

The edge 4 of the comb-shaped electrode may, for example, be coated with a non-conductive layer, or be arranged in a manner such that it is not struck by the beam and the teeth 5 may be provided with a secondary-emission layer.

If the tooth is struck by the complete beam section, a positive control-grid voltage occurs across the resistor 8.

According as an incomplete beam section strikes the tooth, this bias voltage decreases.

The tube is now adjusted in a manner such that it begins to conduct when a small part of the beam strikes the tooth.

Thus, in cooperation with the teeth, the beam itself produces the release pulses.

The same effect is obtained with the use of non-secondary-emission teeth if the electrode 4 is connected to the cathode of the tube 7 or is obtained by using an additional phase-reversing tube.

It will be obvious that, for example, in the case of secondary-emission teeth, the space between these teeth may be filled with conductive material, so that on the side of the screen 3 a plate is arranged having equidistant, secondary-emission strips.

It has been found that a satisfactory control of the beam position requires that the condition:

$$\frac{di_8}{di_2} R_8 S_1 R_{11} S_2 > 1000$$

should be fulfilled, where $i_8$ designates the current passing through the resistor 8 in amperes,
$S_1$ the mutual conductance of the tube 7 in amp./volts,
$i_2$ the anode current of the tube 13 in amperes,
$S_2$ the mutual conductance of the tube 13 in amp./volts,
$R_8$ the value of the resistor 8 in ohms,
$R_{11}$ the value of the resistor 11 in ohms.

It is furthermore desired to choose the time constant of the network, 11, 12 at least 50 times higher than the period of the pulses at the collecting grid 10.

For the sake of completeness it should be noted that it is not necessary to use an additional coil 15 for correcting the vertical scanning, but the correction current $i_2$ may be superposed on the deflection current for the vertical deflection coil already provided.

Fig. 3 shows one embodiment which may be used in a color television system having, in this case, three differently colored interlaced image portions per total image scanning.

In such a system first all red lines $r_1$, $r_2$, $r_3$, and so on, are scanned, then all the green lines $g_1$, $g_2$, and so on, and then all the blue lines $b_1$, $b_2$, and so on.

In such a system the teeth 20 of the comb-shaped electrode 21 are preferably constructed with steps, the number of steps per tooth being equal to the number of image portions from which the total image is built, which may be three in a three-color system.

Viewed in the longitudinal direction of the tooth, i. e. in the line scanning direction, each step shows a portion which is parallel to the associated fluorescent strip and these portions do not overlap one another in the direction of length.

Thus the first portion 22 of the teeth $20^a$ extends, projected on the line scanning direction, as indicated by the line 1 from points 23 to 24: the second portion 25 extends in projection from points 24 to 26 and the portion 27 extends from points 26 to 28, from which it appears that these portions are adjacent one another in the line scanning direction, but do not overlap one another.

As long as the red image portion comprising the lines $r$ must be scanned, the collecting grid pulses for the tube 7 must occur during the time in which the beam moves, in projection, on the line 1, between the points 26 and 28.

If the green image portion is scanned, these pulses must occur during the time interval in which the projection of the beam on the line 1 moves between the points 24 and 26.

When the blue image portion is scanned, these pulses must occur during the time in which the beam moves between the points 23 and 24.

It will be obvious that it is not essential, in this case, whether, for example, the line $r_1$ at the left-hand side of the tooth 20 is still present and may be struck by the beam, or whether it is absent, or covered by the material of the electrode 21, since when the beam is positioned at the left-hand side of the point 26, the tube 7 will be cut off when the red image portion is scanned, so that no variation of the control-voltage due to current supply to the network can occur.

For the sake of completeness it should be noted that it has been suggested to scan interlaced image portions as referred to under Fig. 3 by varying the direction of the scanning beam for each color. The beam positions for scanning, for example, the lines $r_1$, $g_1$, and $b_1$ then provide, in front of the screen to be scanned, a point or line which invariably lies in the beam.

If the teeth of the electrode are arranged in front of the screen in these common lines, the beam may be corrected in position for each line of each of the image portions without requiring that tube 7 be cut off at different instants.

It should finally be noted that the circuit-arrangement according to the invention and the cathode-ray tube suitable for this purpose may be employed not only for color television purposes, but also be of importance for black-white television, if in this case great value is laid on an accurate spacing between the lines to be scanned.

This may, for example, be the case for measuring purposes.

It is of importance to point out in this case that the invention may also be used with electrostatic deflection of the beam, as is frequently used in measuring apparatus.

What I claim is:

A cathode-ray tube provided with a screen having a plurality of equidistant strips of fluorescent material, means to project an electron beam onto said screen, a comb-shaped electrode positioned on the side of said screen, said electrode having a plurality of equidistant teeth which are substantially parallel to and extend along a portion of said strips, said electrode being adapted to generate in cooperation with a control circuit a control voltage which is a function of the disposition of the cathode-ray beam with respect to the teeth of said electrode and which serves to control the deflection of the cathode-ray in a direction perpendicular to said strips, further characterized in that each tooth of the comb-shaped electrode is step-shaped, the number of steps being equal to the number of fields constituting a frame, and that the steps of all teeth, cooperating with a distinct field, extend along the strip of that field over a distinct length and on a distinct place with respect to the direction of the strips and that the steps cooperating with another field extend along the strips of that other field over a distinct length but on another distinct place with respect to the direction of the strips.

References Cited in the file of this patent

UNITED STATES PATENTS

| | | |
|---|---|---|
| 2,415,059 | Zworykin | Jan. 28, 1947 |
| 2,490,812 | Huffman | Dec. 13, 1949 |
| 2,530,275 | Weingarten | Nov. 14, 1950 |
| 2,530,431 | Huffman | Nov. 21, 1950 |
| 2,545,325 | Weimer | Mar. 13, 1951 |
| 2,589,386 | Huffman | Mar. 18, 1952 |
| 2,630,548 | Muller | Mar. 3, 1953 |
| 2,684,454 | Huffman | July 20, 1954 |

FOREIGN PATENTS

| | | |
|---|---|---|
| 868,403 | France | Sept. 29, 1941 |